March 24, 1925.  C. B. HARROP  1,531,181

METHOD AND APPARATUS FOR TREATING CLAY WARE IN TUNNEL KILNS

Filed July 6, 1921  2 Sheets-Sheet 1

Carl B. Harrop
INVENTOR.

BY Edwin P. Corker
ATTORNEYS.

March 24, 1925.                                          1,531,181
C. B. HARROP
METHOD AND APPARATUS FOR TREATING CLAY WARE IN TUNNEL KILNS
Filed July 6, 1921             2 Sheets-Sheet 2

Carl B. Harrop
INVENTOR.

BY Edwin P. Barker
ATTORNEYS.

Patented Mar. 24, 1925.

1,531,181

UNITED STATES PATENT OFFICE.

CARL B. HARROP, OF COLUMBUS, OHIO.

METHOD AND APPARATUS FOR TREATING CLAY WARE IN TUNNEL KILNS.

Application filed July 6, 1921. Serial No. 482,647.

*To all whom it may concern:*

Be it known that I, CARL B. HARROP, a citizen of the United States of America, residing at Columbus, in the county of Franklin and State of Ohio, have invented certain new and useful Improvements in Methods and Apparatus for Treating Clay Ware in Tunnel Kilns, of which the following is a specification.

My invention relates to method and apparatus for treating clay ware in tunnel kilns and pertains to what is commonly known as direct-fired continuous car tunnel kilns. It has to do particularly with the control of temperatures and circulation in a highly novel and effective manner whereby the heat gradient throughout the length of the kiln will be under better control and the temperatures of the ware at all stages of firing will be more uniform throughout the cross-section of the car setting. Hitherto the treatment of clay ware in this type of kiln has largely consisted in passing the ware through a kiln into which heated gases are introduced and then left practically without scientific regulation as to method and degree of actual application.

My invention is founded in part upon a realization that the treatment and more particularly the firing of the clay wares is a scientific problem and should be handled as such. More specifically, I have conceived that the proper firing of clay wares does not consist merely in creating a heated zone and then passing the ware to be fired through such zone, but, that it is highly desirable in the heat treatment of some wares to maintain a nearly constant temperature at certain periods without great rise or fall in such temperatures, while at other periods in the treatment a rapid gain or loss in temperature is desirable. Thus, I have provided a method and means which not only makes possible the variable regulation of temperatures at different periods but which also makes possible the regulation of the lengths of such periods.

More specifically, my invention comprises, in part, the passing of the gases, while treating the ware, through restricted and free areas which may vary in size, and location. This is desirably attained by building the kiln in such a manner that relatively wide and narrow passages for the gases are provided at predetermined sections of the kiln. The result is that the gases passing through the restricted zone or zones will travel with greater velocity than when passing through the free zones. Thus in the restricted zones, the temperature readings of the gases throughout such zones will show little variance, while in the free zones the lessened velocity of the gases will allow them to give up more of their heat because of their lower rate of travel with the result that the temperature readings will show a wide variance from end to end of these zones.

I have found that by the judicious use of these restricted and free zones, the temperature gradient throughout the length of the kiln may be arranged to suit the material to be treated. Thus, it is desirable in the heat treatment of some wares to maintain a steady temperature at certain periods without material rise or fall in the same and for varying lengths of time, while at other periods in the treatment a rapid gain or loss in temperature is desirable.

Another phase of my invention has to do with the maintenance of balanced pressure conditions above and below the car platforms throughout the length of the kiln and the ensuring of a proper circulation of air beneath the car platforms for cooling the cars. In accordance with this, I have provided my kiln with a means whereby, whenever necessary, air may be withdrawn by the pressure fan from beneath the car platforms in zones where there is a negative pressure above the car platforms to ensure a similar negative pressure beneath such platforms. Likewise, in zones where there is a positive pressure above the car platforms as, for instance, at the discharge end of the kiln, I have provided means for injecting air into the space beneath such platforms to ensure a balancing of the positive pressure above in such zones.

There are other features of my method and apparatus which will appear as this description progresses. The preferred embodiment of my invention is shown in the accompanying drawings wherein similar characters of reference designate corresponding parts and wherein—

Figure 2:
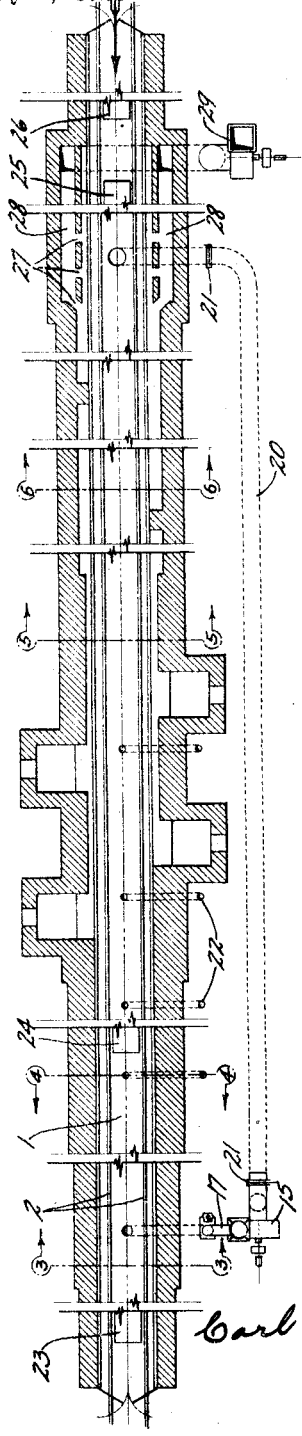
Figure 2 is a horizontal longitudinal section of the structure shown in Figure 1.
Figure 3:
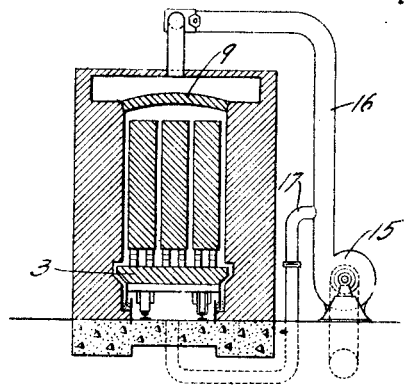
Figure 3 is a transverse section taken on line 3—3 of Figure 2.
Figure 4:
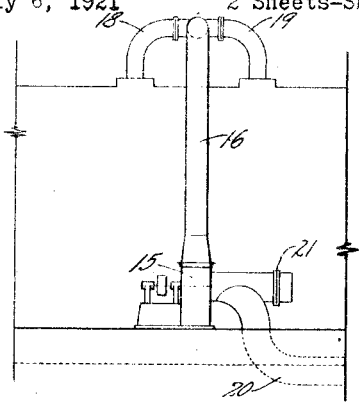
Figure 4 is a detail in side elevation of the structure shown in Figure 3.
Figure 7:
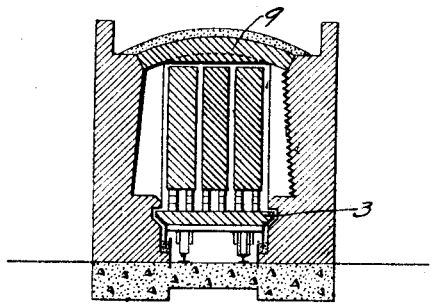

Figure 7 is a transverse section taken on line 6—6 of Figure 2 showing a greater clearance between the ware and the sides of the kiln with a resultant lowering of the velocity of the gases, this figure illustrating serrated surfaces (which for convenience are indicated on one side only) to further amplify the absorption of the heat from the gases and subsequent increased heating of the ware by radiation from such serrated walls.

Figure 8:
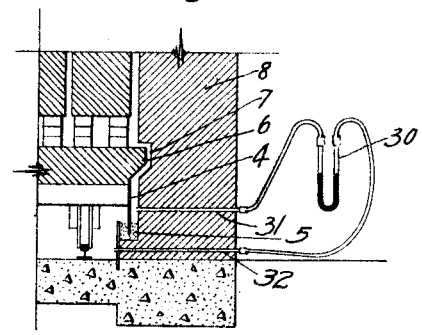

Figure 8 is a detail showing the pressure gage that I desirably utilize to indicate the pressure conditions on opposite sides of the sand seals which separate the space beneath the car platforms from the space above the car platforms and the preferred manner of applying such gage.

In the drawings, I have shown a tunnel kiln having a floor 1 with tracks 2 thereon upon which are designed to run a series of cars that may be designated 3.

These cars are provided with depending side flanges 4 which extend into the sand troughs as indicated at 5 in Figure 8 to form an air seal. The cars are further reduced upon their edges as at 6 so that they fit in horizontal grooves 7 in the vertical walls 8 of the kiln structure.

The crown of the kiln may be designated 9 and is provided with chambers 10 and 11 therein. The chamber 10 is provided at 12 with a port desirably directed away from the discharge end of the kiln but adjacent such discharge end. Air under pressure is introduced into the kiln through the port 12 and passes into cooling contact with the ware and ultimately reaches the furnace zone where it is utilized as secondary air for combustion. The chamber 11 extends along the crown of the kiln and subject to the heat thereof, being provided adjacent one of its ends with downwardly extending delivery channels 13 and 14 leading to the several furnaces.

At one side of the kiln adjacent the ends of the chambers 10 and 11 is provided a pressure fan 15 with an upstanding conduit 16 and with a downwardly turned branch conduit 17. The upwardly extending conduit 16 is provided with a branch conduit 18 that delivers air under pressure into chamber 10 and is also provided with a branch 19 that delivers air under pressure into chamber 11, both branches 18 and 19 being provided with blast gates for controlling the pressure and volume of air admitted to chambers 10 and 11. The downwardly extending branch conduit 17 passes to and delivers air under pressure into the kiln in the space beneath the car platforms at a point near the discharge end of the kiln and near where the positive pressure in the space above the car platforms is the greatest.

The pressure fan is likewise utilized as a vacuum fan by means of a conduit 20 extending into its side and connected at its opposite end beneath the car platforms at a point which is beneath the zone of the greatest draft above the car platforms.

The degree of vacuum and pressure may be controlled at will by the use of blast gates 21 and by the use of air inlets or outlets 22 having valves at their outer ends. These inlets or outlets are in the form of conduits which extend through the base of the kiln and into the space beneath the cars. To facilitate the control of the positive and negative pressures, I have placed air dams 23 beneath the car platforms and near the discharge end of the kiln, as well as a dam 24 at the approximate point in the kiln above which in the main tunnel the pressure changes from positive to negative. In conjunction with these air dams, I have provided air dams 25 and 26 in spaced relation adjacent the entrance end of the kiln. These air dams serve to effectually restrict the area between the base of the kiln and the cars so that the pressure conditions in the space underneath the car platforms may be more readily controlled and made to correspond more closely with the pressure conditions in the tunnel proper above the car platforms. It will be obvious that the pressure beneath the cars can be effectually controlled by opening or closing any one or more of the inlets or outlets 22 and by properly regulating blast gates 21.

Figure 1:
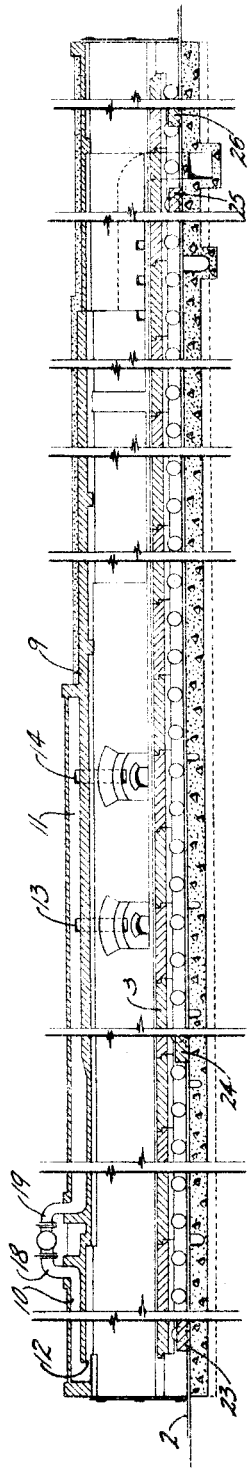
Figure 1 is a vertical longitudinal section of my kiln structure.

By reference to Figures 1 and 2 it will be noted that I have provided a plurality of exhaust ports 27 which connect with the draft ducts 28 that are in turn connected to the exhaust fan 29.

It will also be noted that I have provided a gage 30 with one pipe 31 leading therefrom to the space above the sand seal and with another pipe 32 leading therefrom to the space below the sand seal. A plurality of these gages are to be inserted at frequent intervals within the length of the kiln and they will show at a glance the relative pressures above and below the cars. Whenever these pressures are found to be materially unequal, steps are to be taken to so adjust the pressure underneath the car platforms as to produce substantially balanced pressures on the two sides of the sand seals. Normally, these steps consist in withdrawing air from the lower space underneath the car platform of the kiln when the pressure in this space is in excess of that in the upper space at any given location; or, if the pressure in the upper space is greater, sufficient air will be introduced into the lower space immediately therebeneath to cause a substantially balanced condition.

When the kiln is operated under normal conditions, there will be a condition of positive pressure existing in the kiln above the car platforms from adjacent the discharge end to a point near the fire zone. Approaching the fire zone, the positive pressure will decrease and finally become negative pressure. This negative pressure condition will persist from the fire zone to the charging end of the kiln.

The condition of positive pressure at the discharge end of the kiln naturally results from the admission of air under pressure at the delivery port 12 of the chamber 10. The air traveling through the kiln toward the entrance end cools the fired ware, then becomes secondary air for combustion in the furnace zone and, together with the furnace gases, gives up heat to the incoming ware, being finally drawn out through the exhaust ports 27.

Figure 5:
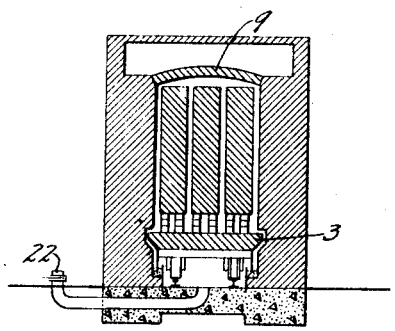
Figure 5 is a transverse section taken on line 4—4 of Figure 2.
Figure 6:
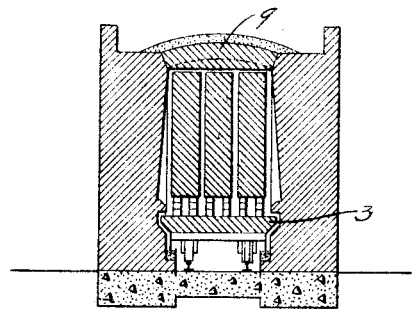
Figure 6 is a transverse section taken on line 5—5 of Figure 2, illustrating a relatively slight clearance which will ensure a particularly high velocity of the gases along the kiln.

By examination of Figures 5, 6 and 7, it will be apparent that varying conditions of clearance will be produced at different zones in the kiln, the location of these zones varying somewhat with the different classes of ware to be fired. It will be obvious that it thus becomes possible to regulate the velocity of the heating gases throughout these passages along the kiln, providing an increased velocity at certain locations with a consequent slight drop in the temperature of the gases throughout such passages and providing a decreased velocity at other locations with a consequent increased absorption of heat from the gases and a much greater variance in the temperature readings from end to end of such sections. It will be further obvious that the heating action may be increased by the introduction of irregularities in the wall structure of the kiln, providing greater surfaces for the absorption and radiation of heat, this being particularly desirable in the enlarged areas.

Having thus described my invention, what I claim is:

1. The method of treating clay ware in a tunnel kiln which comprises passing the heating gases in direct contact with the ware and controlling the velocity of the gases to regulate the amount of heat imparted to the kiln walls and to the ware at different zones in the kiln.

2. The method of treating clay ware in a tunnel kiln which comprises passing the ware through the kiln on ware carrying units which are so constructed that the space above the cars will be sealed from the space below the car platforms, and maintaining substantially the same pressure both above and below the car platforms.

3. The method of treating clay ware in a tunnel kiln which comprises maintaining at any given location substantially the same positive or negative pressure beneath the car platforms as exists above.

4. The method of treating clay ware in a tunnel kiln which comprises withdrawing air from beneath the car platforms in those locations where negative pressure exists above said platforms.

5. The method of treating clay ware in a tunnel kiln which comprises introducing air under pressure beneath the car platforms in those locations where pressure exists above said platforms and withdrawing air from beneath the car platforms in those locations where negative pressure exists above said platforms.

6. The method of treating clay ware in a tunnel kiln which comprises separating the space beneath the cars into one space which is substantially coincident with the pressure location above and into a second space which is substantially coincident with the negative pressure location above, and regulating the air pressure in both spaces to produce a balanced pressure above and below.

7. A tunnel kiln which is constructed internally with clearances between the ware setting and the kiln walls of varying area at different locations.

8. A tunnel kiln wherein the heating gases pass in direct contact with the ware which is constructed internally with irregular or serrated surfaces at chosen locations to increase the heat absorbed in such locations from the gases passing therethrough.

9. A tunnel kiln wherein the heating gases pass in direction contact with the ware comprising irregularities in its interor wall surfaces to vary the heat absorbed from the gases and radiated to the ware.

10. A tunnel kiln wherein the heating gases pass in direct contact with the ware comprising serrations in its interior wall surfaces to increase the heat absorbed from the gases.

11. A tunnel kiln comprising relatively large and small areas through which the ware and the gases both pass and which have serrated walls.

12. A tunnel kiln comprising means for delivering air under pressure to the space beneath the car platforms in the location where positive pressure exists above said platforms.

13. A tunnel kiln comprising means for delivering air under pressure to the space beneath the car platforms in the location where positive pressure exists above said platforms and a plurality of independent regulable inlets or outlets in such space.

14. A tunnel kiln comprising means for withdrawing air from the space beneath the car platforms in the location where negative pressure exists above said platforms.

15. A tunnel kiln comprising means for delivering air under pressure to the space beneath the car platforms in the location where positive pressure exists above said platforms and means for withdrawing air from the space beneath the car platforms in the location where negative pressure exists above said platforms.

16. A tunnel kiln comprising means for delivering air under pressure to the space beneath the car platforms in the location where positive pressure exists above said platforms, means for withdrawing air from the space beneath the car platforms where negative pressure exists above said platforms and means for substantially separating such spaces from each other.

17. A tunnel kiln comprising means for delivering air under pressure to the space beneath the car platforms in the location where positive pressure exists above said platforms, means for withdrawing air from the space beneath the car platforms where negative pressure exists above said platforms, means for substantially separating such spaces from each other and means for indicating relative pressure conditions at various points above and below the car platforms.

18. A tunnel kiln comprising means for delivering air under pressure to the space beneath the car platforms in the zone where positive pressure exists above said platforms, means for withdrawing air from the space beneath the car platforms in the zone where negative pressure exists above said platforms and air dams for substantially separating said spaces.

In testimony whereof I hereby affix my signature.

CARL B. HARROP.